US005834536A

United States Patent [19]

Scholl

[11] Patent Number: 5,834,536
[45] Date of Patent: Nov. 10, 1998

[54] PROCESS FOR PRODUCING IMMOBILIZED POLYSULPHIDE SILANES AND THEIR USE FOR PRODUCING RUBBER MIXTURES AND VULCANISATES

[75] Inventor: Thomas Scholl, Bergisch Gladbach, Germany

[73] Assignee: Bayer AG, Germany

[21] Appl. No.: 693,611

[22] Filed: Aug. 7, 1996

[30] Foreign Application Priority Data

Aug. 16, 1995 [DE] Germany .................. 195 29 916.7

[51] Int. Cl.$^6$ ..................................... C08K 9/06
[52] U.S. Cl. ................ 523/211; 524/609; 524/881; 524/858; 524/791; 524/790; 524/783; 524/779; 524/788; 524/837; 528/10; 528/26; 528/25; 528/27; 528/42
[58] Field of Search ............ 523/212; 524/609, 524/881, 858, 588, 791, 790, 783, 779, 837, 788; 528/10, 26, 27, 25, 42

[56] References Cited

U.S. PATENT DOCUMENTS

| | | |
|---|---|---|
| 3,842,111 | 10/1974 | Meyer-Simon et al. . |
| 3,957,718 | 5/1976 | Pochert et al. . |
| 3,978,103 | 8/1976 | Meyer-Simon et al. . |
| 3,997,356 | 12/1976 | Thurn et al. ............. 106/288 Q |
| 4,076,550 | 2/1978 | Thurn et al. ............. 106/288 Q |
| 4,128,438 | 12/1978 | Wolff et al. .............. 106/307 |
| 4,514,231 | 4/1985 | Kerner et al. ............ 106/309 |
| 4,704,414 | 11/1987 | Kerner et al. ............ 523/212 |

FOREIGN PATENT DOCUMENTS

| | | |
|---|---|---|
| 0126871 | 12/1984 | European Pat. Off. . |
| 2141159 | 3/1973 | Germany . |
| 2141160 | 3/1973 | Germany . |
| 2212239 | 10/1973 | Germany . |
| 2255577 | 6/1974 | Germany . |
| 2401056 | 7/1975 | Germany . |
| 2747277 | 4/1979 | Germany . |
| 55-076860 | 6/1980 | Japan . |

OTHER PUBLICATIONS

Noll, W.: "Chemie und Technologie der Silicone", Verlag Chemie, Weinheim; pp. 74–75, 162–165, 163.

*Primary Examiner*—Melvyn I. Marquis
*Attorney, Agent, or Firm*—Connolly & Hutz

[57] ABSTRACT

The invention relates to a process for producing immobilized polysulphide silanes, characterized by the conversion of a halogenated alkyl silane (A), optionally in the presence of a further organic halogen compound (B), with a polysulphide (C) in the presence of water and an inorganic or organic carrier material, wherein the content of the carrier material in the (dried and water-insoluble) end product is 20 to 99.5 wt. %.

The immobilized polysulphide silanes are used for producing rubber mixtures and vulcanisates, particularly for tires, which have a low rolling resistance and an enhanced thermal load capacity.

20 Claims, No Drawings

PROCESS FOR PRODUCING IMMOBILIZED POLYSULPHIDE SILANES AND THEIR USE FOR PRODUCING RUBBER MIXTURES AND VULCANISATES

The invention relates to a new process for producing silanes containing sulphur which are immobilized, i.e. applied to carrier materials. The silanes containing sulphur produced according to the invention are suitable for producing rubber mixtures and for producing moulded bodies therefrom, particularly for producing tyres which have a low rolling resistance and an enhanced dynamic and thermal load capacity (reversion stability).

Polysulphide silanes, particularly bis-(triethoxysilylpropyl)-tetrasulphide, are frequently used in the rubber industry, particularly in rubber mixtures which contain bright fillers. The polysulphide silanes create a chemical bond between filler and rubber and thus increase the reinforcement level of the bright fillers Polysulphide silanes of this kind are described in DE-A 2 141 159 and 2 255 577. The disadvantage of these compounds is their complex manufacturing process, particularly the working in a completely anhydrous medium and with anhydrous sodium sulphide in order to protect the corresponding silyl ether groups from hydrolysis.

U.S. Pat. Nos. 4,514,231 and 4,704,414 describe the surface modification of siliceous fillers with the silanes of DE-A 2,141,159 and 2,255,577 in aqueous suspension in quantities of 0.3 to 15 wt. % of silane, related to siliceous filler. The silanes used were of course also produced in a completely anhydrous reaction in this case.

A surprisingly simple process for producing highly effective polysulphide silanes has now been found, which is characterized in that a halogenated alkyl silane (A), optionally in the presence of a further organic halogen compound (B), is converted with a polysulphide (C) in the presence of water and an inorganic or organic carrier material at temperatures of 0°–220° C., wherein the content of the carrier material in the (water-insoluble and dried) end product is 20 to 99.5 wt. %.

The molar ratio of the components (A)+(B):(C) depends on the number of bound halogen atoms in the starting compounds (A) and (B) and is in the range from 1.5 to 3 mols of bound halogen per mol of polysulphide (C).

Halogenated alkyl silanes (A), organic halogen compounds (B) and polysulphides (C) which are used in the process according to the invention are those of the formulae

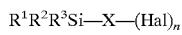 (A)

 (B)

 (C)

wherein $R^1$, $R^2$ and $R^3$ are the same or different and stand for chlorine-, $C_1$–$C_{18}$-alkyl- or $C_1$–$C_{18}$-alkoxy groups, which can optionally be interrupted by oxygen, nitrogen or sulphur atoms, or mean $C_6$–$C_{12}$-phenyl-, -phenoxy, $C_7$–$C_{18}$-alkyl aryl or -alkyl aryloxy with the proviso that at least one of the groups $R^1$ to $R^3$ is an alkoxy-, phenoxy- or alkyl aryloxy group or a chlorine atom.

X stands for linear, branched or cyclic, optionally unsaturated, $C_1$–$C_{18}$-alkylene groups, which can optionally be interrupted by oxygen atoms, Y stands for a mono- to tetravalent linear, branched, optionally unsaturated or aromatic $C_1$–$(C_{36})$-hydrocarbon group, which can be optionally substituted by $C_1$–$C_{12}$-aryl, $C_1$–$C_{12}$-alkoxy, hydroxy-, cyano-, amide-, $C_1$–$C_{17}$-COO— or $C_1$–$C_{18}$-OOC groups, carboxylic acid and sulphonic acid groups as well as their salts and can also optionally be interrupted by oxygen, nitrogen or sulphur atoms, or stands for a mono- to trivalent heteroaryl group, m stands for a whole number from 1 to 4,
n stands for a whole number from 1 to 3,
x means a number from 1 to 8,
Hal stands for fluorine, chlorine or bromine and
Me stands for ammonium or a metal atom.

Preferred halogenated silanes (A) are those of the formula

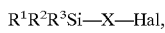

for example, wherein $R^1$, $R^2$ and $R^3$ stand, independently of each other, for chlorine atoms or $C_1$–$C_{12}$-alkyl groups, $C_1$–$C_{12}$-alkoxy groups which can be interrupted by oxygen or sulphur atoms in each case, or for $C_6$–$C_{12}$-aryl- or $C_6$–$C_{12}$-aryloxy groups, and wherein X stands for linear, branched or cyclic $C_1$–$C_{18}$-alkylene groups which can optionally be substituted by oxygen atoms, and in which Hal stands for fluorine, chlorine or bromine.

Particular examples of these are 1-chloromethyltrimethoxysilane, 1-chloromethyltriethoxysilane, 1-chloromethyltributoxysilane, 1-chloromethyl-triethoxyethoxysilane, 1-chloromethyl-methyl-dimethoxysilane, 1-chloromethyl-methyl-diethoxysilane, 1-chloromethyl-methoxy-dibutoxysilane, 1-chloromethyl-dimethyl-methoxysilane, 1-chloromethyl-dimethyl-ethoxysilane, 1-chloromethyl-dimethyl-butoxysilane, 3-chloropropyltrimethoxysilane, 3-chloropropyltriethoxysilane, 3-chloropropyltripropoxysilane, 3-chloropropyltributoxysilane, 3-chloropropylpentoxysilane, 3-chloropropyltrihexoxysilane, 3-chloropropyltrioctoxysilane, 3-chloropropyl-triphenoxysilane, 3-chloropropylmethyldimethoxysilane, 3-chloropropyl-methyldiethoxysilane, 3-chloropropyl-methyl-dibutoxysilane, 3-chloropropyl-dimethylmethoxysilane, 3-chloropropyl-dimethyl-ethoxysilane, 3-chloropropyl-diethylphenoxysilane. Particularly preferred are 1-chloromethyl-methyl-diethoxysilane and 3-chloropropyltriethoxysilane.

Examples of preferred organic halogen compounds (B) are alkylmonohalides, such as methyl chloride, ethyl chloride, propyl chloride, butyl chloride, hexyl chloride, octyl chloride, dodecyl chloride, octadecyl chloride, benzyl chloride, chloroethanol, chloropropanol, chloroacetic acid and its alkali metal salts, chloropropionic acid and its alkali salts, as well as alkylenedihalides in which Y is methylene-, ethylene-, propylene-, 2-hydroxypropylene-, butylene, hexylene, cyclohexylene-, octylene-, decyclene-, dedecyclene-, 2,2'-oxydiethylene-, methylene-bis-(2,2'-oxyethylene)-, ethylene-(bis-2,2'-oxyethylene)-, 2,2'-thiodiethylene-, N-methyl-N'N''-diethylene or α,α-p-xylidene groups; or also 1,2,3-trichloropropane, 1,3,5-trichlorotriazine. The organic halogen compounds (B) can be used individually or also in a mixture. 1,6-dichlorohexane and bis-(chloroethyl)-methylal as well as 1,2,3-trichloropropane are particularly preferred.

Preferred molar ratios of the halogenated alkyl silanes (A) and further organic halogen compounds (B) are 1:0 to 1:100. Particularly preferred ratios are 1:0 to 1:30.

As polysulphides (C), those in which Me stands for ammonium, lithium, sodium or potassium are preferably used.

Water is used as the reaction medium. Mixtures of water with organic solvents such as methanol, ethanol, n-propanol, i-propanol, i-butanol, amyl alcohol, hexyl alcohol, n-octanol, i-octanol, ethylene glycol, 1,2- and 1,3-propylene glycol, 1-4-butanediol, 1,6-hexanediol, can also be used, as well as mixtures with aromatic, aliphatic or cycloaliphatic hydrocarbons such as toluene, cyclohexane, hexane, octane or open-chain or cyclic ethers such as diethyl ether, dibutyl ether, tetrahydrofuran, 1,3-dioxolane.

Examples of particularly suitable organic and inorganic carrier materials for the process according to the invention are:

Carbon blacks. The carbon blacks to be used in this case are produced by the flame black, furnace or gas black process and have BET surfaces of 20 to 200 m$^2$/g, such as SAF-, ISAF-, IISAF-, HAF-, FEF- or GPF-blacks.

Highly dispersed silicic acids, produced, for example, by precipitation of solutions of silicates or flame hydrolysis of silicon halides with specific surfaces of 5 to 1000, preferably 20 to 400 m$^2$/g (BET surface) and with primary particle sizes of 5 to 400 nm. The silicic acids can optionally also be present as mixed oxides with other metal oxides such as Al, Mg, Ca, Ba, Zn and Ti oxides.

Synthetic silicates, such as aluminium silicate, alkaline earth silicates such as magnesium silicate or calcium silicate, with BET surfaces of 20 to 400 m$^2$/g and primary particle diameters of 10 to 400 nm.

Natural silicates such as kaolin and other naturally occurring silicas.

Metal oxides such as zinc oxide, calcium oxide, magnesium oxide, aluminium oxide Metal carbonates such as magnesium carbonate, calcium carbonate, zinc carbonate Metal sulphates such as calcium sulphate, barium sulphate Metal hydroxides such as aluminium hydroxide, magnesium hydroxide for example Glass fibres and glass fibre products (mats, strands) or micro-glass balls.

Carbon blacks with BET surfaces of 20 to 400 m$^2$/g or highly dispersed silicic acids, produced by precipitation of solutions of silicates, with BET surfaces of 20 to 400 m$^2$/g are preferred. The said carrier materials can be used alone or in the mixture. Particularly preferred products contain 25–99 wt. % of carrier material in the end product (dry weight).

The molar ratio of the components (A):(B):(C) depends on the number of bound halogen atoms in the starting compounds (A) and (B) and is 1.5–3 mols of reactive (mono-)halide per mol of polysulphide. Ideally it is selected in such a way that 2 mols of (mono-)halide are converted per mol of polysulphide. The quoted molar ratios relate to monohalogen compounds. Where polyhalogen compounds are used the ratio of polysulphide to polyhalogen compound must be correspondingly re-calculated. The stated molar ratios apply only to halogen compounds that are reactive with respect to polysulphides in aqueous solution.

Where halogenalkylsilanes (A) are used with at least one of R$^1$–R$^3$ being a chlorine atom, the further addition of a base is recommended to neutralize the generated hydrogenchloride. Suitable bases are for example NaOH, KOH, Ca(OH)$_2$, Na$_2$CO$_3$ or K$_2$CO$_3$ in an stoichiometric amount sufficient to neutralize the generated hydrogenchloride.

The reaction temperatures are 0° to 200° C.; work can optionally be carried out under pressure. The reaction times are between a few minutes and 24 hours.

Following the reaction the reaction product can be filtered off, freed from water-soluble metal halide by washing and dried. The moist reaction product can also be further processed immediately after the reaction, for example so as to produce rubber/filler masterbatches in which the silane containing sulphur and immobilized on the carrier material can be used both as reinforcing filler and as reinforcer additive in combination with further fillers.

The invention also provides rubber mixtures containing a rubber, a filler, optionally further rubber auxiliary substances and an immobilized polysulphide silane produced by the process according to the invention in quantities of 0.1 to 200 wt. % related to the quantity of the rubber used in each case, and the vulcanisates and moulded bodies manufactured therefrom.

Synthetic rubbers as well as natural rubbers are suitable for producing rubber mixtures according to the invention. Preferred synthetic rubbers are described, for example, in W. Hofmann, Kautschuktechnologie, Gentner Verlag publishers, Stuttgart 1980 or in I. Franta, Elastomers and Rubber Compounding Materials, Elsevier, New York 1989. Among others they comprise:

BR—Polybutadiene

ABR—Butadiene/alkyl-C$_{1-4}$-acrylate-copolymers

IR—Polyisoprene

SBR—Styrene/butadiene copolymers with styrene contents of 1 to 60, preferably 2 to 50 wt. %

XSBR—Styrene/butadiene copolymers and graft polymers with further unsaturated polar monomers, such as acrylic acid, methacrylic acid, acrylonitrile, hydroxyethylacrylate, hydroxyethylmethacrylate etc. with styrene contents of 2–50 wt. % and contents of polar monomers incorporated by polymerization of 1–30 wt. %.

IIR—Isobutylene/isoprene copolymers

NBR—Butadiene/acrylonitrile copolymers with acrylonitrile contents of 5 to 60, preferably 10 to 50 wt. %

HNBR—partially hydrated or completely hydrated NBR rubber

EPDM—Ethylene/propylene/diene copolymers as well as mixtures of these rubbers. Of particular interest for producing vehicle tyres are anionically polymerized L-SBR rubbers with a glass temperature above −50° C., which can optionally be modified with silyl ethers or further functional groups, such as are described in EP-A 447 066, and their mixtures with diene rubbers.

The addition of the immobilized silanes containing sulphur according to the invention and the addition of further fillers preferably takes place at batch temperatures of 100° to 200° C., although it can also take place subsequently at lower temperatures (40° to 100° C.) for example together with further rubber auxiliary substances.

Particularly suitable fillers for producing the rubber mixtures and vulcanisates according to the invention are Carbon blacks. The carbon blacks to be used in this case are produced by the flame black, furnace or gas black process and have BET surfaces of 20 to 200 m$^2$/g, such as SAF-, ISAF-, IISAF-, HAM-, FEF- or GPF-blacks.

Highly dispersed silicic acids, produced, for example, by precipitation of solutions of silicates or flame hydrolysis of silicon halides with specific surfaces of 5 to 1000, preferably 20 to 400 m$^2$/g (BET surface) and with primary particle sizes of 5 to 400 nm. The silicic acids can optionally also be present as mixed oxides with other metal oxides such as Al, Mg, Ca, Ba, Zn and Ti oxides.

Synthetic silicates, such as aluminium silicate, alkaline earth silicates such as magnesium silicate or calcium silicate, with BET surfaces of 20 to 400 $m^2/g$ and primary particle diameters of 10 to 400 nm.

Natural silicates such as kaolin and other naturally occurring silicas.

Metal oxides such as zinc oxide, calcium oxide, magnesium oxide, aluminium oxide Metal carbonates such as magnesium carbonate, calcium carbonate, zinc carbonate Metal sulphates such as calcium sulphate, barium sulphate Metal hydroxides such as aluminium hydroxide and magnesium hydroxide Glass fibre and glass fibre products (mats, strands) or micro-glass balls.

The said fillers can be used alone or in a mixture. In a particularly preferred embodiment of the process, 10 to 150 parts by weight of white fillers, optionally together with 0 to 100 parts by weight of carbon black, and 0.3 to 40 parts by weight of an immobilized silane containing sulphur produced by the process according to the invention, each related to 100 parts by weight of rubber, are used to produce the mixtures, wherein the immobilized silane containing sulphur has a carrier content of 40 to 80 wt. %.

The rubber vulcanisates according to the invention can contain further rubber auxiliary substances such as reaction accelerators, ageing resistors, heat stabilizers, light stabilizers, anti-ozonants, processing auxiliary substances, plasticizers, tackifiers, expanding agents, dyes, pigments, waxes, extenders, organic acids, retarding agents, metal oxides as well as activators such as triethanolamine, polyethylene glycol, hexanetriol, which are known to the rubber industry.

The rubber auxiliary substances are used in conventional quantities which are determined by the field of application among other things. Conventional quantities are quantities of 0.1 to 50 wt. %, for example, related to rubber.

Sulphur, sulphur donors or peroxides can be used as conventional curing agents. The rubber mixtures according to the invention can also contain vulcanization accelerators. Examples of suitable vulcanization accelerators are mercaptobenzthiazoles, -sulphenamides, guanidines, thiurams, dithiocarbamates, thioureas and thiocarbonates. The vulcanization accelerators and sulphur or peroxides, are used in quantities of 0.1 to 10 wt. %, preferably 0.1 to 5 wt. %, related to rubber.

The vulcanization of the rubber mixtures according to the invention can take place at temperatures of 100° to 200° C., preferably 130° to 180° C., optionally under pressure of 10 to 200 bar.

The mixing of the rubbers with the filler, optionally rubber auxiliary substances and the immobilized silanes containing sulphur according to the invention can be carried out in conventional mixing machines such as rollers, kneaders and mixing extruders.

The rubber vulcanisates according to the invention are suitable for producing moulded bodies, for the manufacture of cable sheaths, hoses, drive belts, conveyor belts, roller coatings, tyres, shoe soles, sealing rings and damping elements for example.

EXAMPLES

Example 1

65 g (0.5 mol) of $Na_2S \times 3H_2O$ ($Na_2S$ content 60 wt. %) and 48 g (1.5 mol) of sulphur were heated to 70° C. for 30 minutes in 1000 ml of water, so that a sodium polysulphide solution formed. 269 g of Vulkasil S (highly active precipitated silicic acid made by Bayer AG, BET surface approx. 180 $m^2/g$) were then added. 240.4 g (1.0 mol) of 3-chloropropyltriethoxysilane were then added dropwise at 70° C. and heating took place for 18 hours to 80° C. After cooling the solid was filtered off and washed with water and dried in a high vacuum for 6 hours, firstly at room temperature and subsequently at 80° C. 504 g of a white powder were obtained. The carrier material content is approx. 53 wt. %.

Example 2

48.75 g (0.375 mol) of $Na_2S \times 3H_2O$ ($Na_2S$ content approx. 60 wt. %) and 36 g of sulphur were heated to 70° C. for 30 minutes in 500 ml of water, so that a sodium polysulphide solution formed. 125 g of Vulkasil S and 0.5 g of a conversion product of nonylphenol with 10 mols of ethylene oxide as emulsifier were then added and then firstly 45.1 g (0.188 mol) of 3-chloropropyl-triethoxysilane and after an hour at 70° C. 48.7 g (0.281 mol) of bis-(chloroethyl)-methylal were added dropwise. Heating to 80°–90° C. took place for 14 hours, followed by cooling, filtration and washing with water. After drying at 80° C. in a high vacuum 216 g of a white powder were obtained. The carrier material content is approx. 58 wt. %.

Example 3

65 g (0.5 mol) of $Na_2S \times 3H_2O$ (approx. 60 wt. % $Na_2S$) and 48 g (1.5 mol) of sulphur are heated to 70° C. for one hour in 1000 ml of water. 1 g of an addition product of nonylphenol and 10 mols of ethylene oxide as emulsifier was then added, as well as 269 g of Corax N 339 black (Degussa), and 240.4 g (1 mol) of 3-chloropropyl-triethoxysilane were added dropwise at the same temperature. Further agitation took place for 14 hours at 70°–80° C., followed by filtering off and washing with water. After drying there were 483 g of a black powder. The carrier material content is approx. 56 wt. %.

Example 4

97.5 g (0.75 mol) of $Na_2S \times 3H_2O$ (approx. 60 wt. % $Na_2S$ content) and 72 g (2.25 mol) of sulphur were heated to 70° C. for 45 minutes in 1000 ml of water. 250 g of N 339 black and 1 g of a conversion product of nonylphenol with 10 mols of ethylene oxide were then added. A mixture of 90.2 g (0.375 mol) of 3-chloropropyl-triethoxysilane and 97.3 g (0.563 mol) of bis-(chloroethyl)-methylal was then added dropwise and heated to 80° C for 14 hours. After filtering off, washing with water and drying, 472 g of a black powder were obtained. The carrier material content is approx. 53 wt. %.

Example 5 (producing rubber mixtures and vulcanisates)

The following mixtures were produced in a kneader within 5 minutes at 130° C. After they became cold the crude mixtures were kneaded for a further 3 minutes at 120°–130° in the kneader. Sulphur and accelerator were subsequently mixed in on the roller at 50° C.

| Composition: | A | B | C | Comparison |
|---|---|---|---|---|
| L-SBR Buna VSL 1954 S 25 (Bayer) | 75 | | | |
| BR-rubber Buna CB 11 (Bayer) | 25 | | | |
| Corax N 339 black (Degussa) | 6 | 6 | 0 | 6 |
| Vulkasil S (Bayer) silicic acid | 73.5 | 73.5 | 80 | 80 |
| Stearic acid | 1 | | | |
| Zinc oxide | 2.5 | | | |
| Vulcanox 4020 (Bayer) anti-ozonant | 1 | | | |
| Antilux 654 (Rheinchemie) anti-ozonant wax | 1.5 | | | |
| Compound as per Example 1 | 13 | 0 | 0 | 0 |
| Compound as per Example 2 | 0 | 13 | 0 | 0 |
| Compound as per Example 4 | 0 | 0 | 13 | 0 |
| Bis-(triethoxysilyl-propyl)-tetrasulphide according to DB-OS 2 255 577 | 0 | 0 | 0 | 6.5 |
| Sulphur | 1.5 | | | |
| CBS, Vulkacit CZ (Bayer) | 1.5 | | | |
| Diphenylguanidine, Vulkacit DPG (Bayer) | 2 | | | |

The rubber mixtures were then vulcanized for 40 minutes at 160° C. The following vulcanisate properties were found:

| Property: | A | B | C | Comparison |
|---|---|---|---|---|
| Stress value at 300% elongation (MPa) | 13.8 | 13.9 | 13.4 | 13.5 |
| Tensile strength (MPa) | 17.7 | 18.1 | 16.4 | 18.3 |
| Elongation at rupture (%) | 368 | 384 | 360 | 387 |
| Hardness (Shore A) | 72 | 80 | 81 | 73 |
| Elasticity (%) at 23° C. | 26 | 30 | 31 | 28 |
| Elasticity (%) at 70° C. | 46 | 47 | 48 | 46 |

From the mechanical properties of the vulcanisates it can be seen that the effect of the immobilized silanes according to the invention produced in aqueous suspension is similar to the comparative compound bis-(triethyoxysilylpropyl)-tetrasulphide produced in organic solvent under anhydrous conditions.

I claim:

1. A process for producing a polysulphide silane applied to a carrier materials, which comprises reacting a halogenated alkyl silane (A), optionally in the presence of an organic halogen compound (B), with a polysulphide (C) in the presence of water and an inorganic or organic carrier material at a temperature of 0° to 220° C., wherein the content of the carrier material in the end product is 20 to 99.5 wt., based on the total weight of the dried, solid end product, and wherein the molar ratio of the components (A)+(B):(C) depends on the number of bound halogen atoms in the starting compounds (A) and (B) and is in a range of from 1.5 to 3 mols of bound halogen per mol of polysulphide (C).

2. The process according to claim 1, wherein the halogenated alkyl silane (A), organic halogen compound (B) and polysulphide (C) have the formulae:

$R^1R^2R^3Si-X-Hal$ (A)

$Y-(Hal)_m$ (B)

$Me_2S_x$, (C)

where $R^1$, $R^2$ and $R^3$ are the same or different and stand for a chlorine atom, $C_1-C_{18}$-alkyl or $C_1-C_{18}$-alkoxy group, $C_6-C_{12}$-phenyl or $C_6-C_{12}$-phenoxy group, or $C_7-C_{18}$-alkyl aryl or $C_7-C_{18}$-alkyl aryloxy group, wherein the $C_1-C_{18}$-alkyl or $C_1-C_{18}$-alkoxy group is optionally interrupted by an oxygen, nitrogen or sulphur atom, with the proviso that at least one of $R^1$, $R^2$ and $R^3$ is an alkoxy group, phenoxy group, alkyl aryloxy group or a chlorine atom, X stands for a linear, branched or cyclic $C_1-C_{18}$-alkylene group, optionally interrupted by an oxygen atom, Y stands for a mono- to tetravalent linear, branched, optionally unsaturated or aromatic $C_1-C_{36}$-hydrocarbon group, optionally substituted by a $C_1-C_{12}$-aryl, $C_1-C_{12}$-alkoxy, hydroxy, cyano, amide, $C_1-C_{17}$-COO—, $C_1-C_{18}$-OOC, carboxylic acids or sulphonic acid group or a salt of the carboxylic acid or sulphonic acid group, wherein the $C_1-C_{36}$ hydrocarbon group is optionally interrupted by an oxygen, nitrogen, or sulphur atom, or X stands for a mono- to trivalent hetroaryl group, m stand for a whole number from 1 to 4, x means a number from 1 to 8, Hal stands for fluorine, chlorine or bromine, and Me stands for an ammonium group or a metal atom.

3. A rubber mixture comprising a rubber, at least one polysulphide silane applied to a carrier material, which polysulphide silane is prepared by the process as claimed in claim 1, in quantities of 0.1 to 200 wt. %, based on the total weight of the rubber, and optionally, one or more rubber auxiliary substances, curing agents, fillers, vulcanization accelerators, or a mixture thereof.

4. The process according to claim 2, wherein the halogenated alkyl silane (A) is 1-chloromethyltrimethoxysilane, 1-chloromethyltriethoxysilane, 1-chloroethyltributoxysilane, 1-chloromethyl-triethoxyethoxysilane, 1-chloromethyl-methyldimethoxysilane, 1-chloromethyl-methyl-diethoxysilane, 1-choromethyl-methoxy-dibutoxysilane, 1-chloromethyl-dimethylmethoxysilane, 1-chloromethyl-dimethyl-ethoxysilane, 1-chloromethyl-dimethyl-butoxysilane, 3-chloropropyltrimethoxysilane, 3-chloropropyltriethoxysilane, 3-chloropropyltripropoxysilane, 3-chloropropyltributoxysilane, 3-chloropropylpentoxysilane, 3-chloropropyltrihexoxysilane, 3-chloropropyltrioctoxysilane, 3-chloropropyl-triphenoxysilane, 3-chloropropylmethyldimethoxysilane, 3-chloropropyl-methyldiethoxysilane, 3-chloropropyl-methyl-dibutoxysilane, 3-chloropropyl-dimethyl-methoxysilane, 3-chloropropyl-dimethylethoxysilane, 3-chloropropyl-diethyl-phenoxysilane.

5. The process according to claim 2, wherein the organic halogen compound (B) is methyl chloride, ethyl chloride, propyl chloride, butyl chloride, hexyl chloride, octyl chloride, dodecyl chloride, octadecyl chloride, benzyl chloride, chloroethanol, chloropropanol, chloroacetic acid, an alkali metal salt of chloroacetic acid, chloropropionic acid, an alkali salt of chloropropionic acid, 1,2,3-trichloropropane, 1,3,5-trichlorotriazine, or an alkylenedihalide in which Y is methylene, ethylene, propylene, 2-hydroxypropylene, butylene, hexylene, cyclohexylene, octylene, decyclene, dedecyclene, 2,2'-oxydiethylene, methylene-bis-(2,2'-oxyethylene), ethylene-(bis-2,2'-oxyethylene), 2,2'-thiodiethylene, N-methyl-N'N"-diethylene, or α,α-p-xylidene group, or a mixture thereof.

6. The process according to claim 2, wherein the polysulphide (C) is the ammonium group or a lithium, sodium or potassium atom.

7. The process according to claim 1, wherein the molar ratio of the halogenated alkyl silane (A) to the organic halogen compound (B) is from 1:0 to 1:100.

8. The process according to claim 1, wherein the carrier material is a carbon black, a silicic acid, a silicate, a metal oxide, a metal carbonate, a metal sulphate, a metal hydroxide, a glass fiber, a glass fiber product, a glass ball, or a mixture thereof.

9. The process according to claim 1, wherein at least one of $R^1$, $R^2$ and $R^3$ is a chlorine atom, and wherein the process further comprises adding a base.

10. The process according to claim 9, wherein the base is NaOH, KOH, $Ca(OH)_2$, $Na_2CO_3$ or $K_2CO_3$.

11. The rubber mixture according to, claim 3, wherein the rubber starting compound is synthetic or natural.

12. The rubber mixture according to claim 11, wherein the synthetic rubber is polybutadiene, a butadiene/alkyl-$C_{1-4}$-acrylate-copolymer, polyisoprene, a styrene/butadiene copolymer having a styrene content of 1 to 60 wt. %, a mixture of a styrene/butadiene copolymer and a graft polymer with an unsaturated polar monomer having a styrene content of 2 to 50 wt. % and an unsaturated polar monomer content incorporated by polymerization of 1 to 30 wt. %, an isobutylene/isoprene copolymer, a butadiene/acrylonitrile copolymer having an acrylonitrile content of 5 to 60 wt. %, a partially or completely hydrated butadiene/acrylonitrile copolymer, an ethylene/propylene/diene copolymer or a mixture thereof.

13. The rubber mixture according to claim 12, wherein the synthetic rubber starting compound is the styrene/butadiene copolymer rubber having a styrene content of 1 to 60 wt. % and which is anionically polymerized, has a glass temperature of more than −50° C., is optionally modified with a silyl ether or another functional group, and is optionally mixed with a diene rubber.

14. The rubber mixture according to claim 3, wherein the filler is a carbon black, a silicic acid, a silicate, a metal oxide, a metal carbonate, a metal sulphate, a metal hydroxide, a glass fiber, a glass fiber product, a glass ball, or a mixture thereof.

15. The rubber mixture according to claim 14, wherein the filler comprises 10 to 150 wt. % of white fillers, 0 to 100 wt. % of carbon black, and 0.3 to 40 wt. % of the polysulphide silane applied to a carrier material, based on the total weight of the rubber, and wherein the content of the carrier material in the end product is 40 to 80 wt. %, based on the total weight of the dried, solid end product.

16. The rubber mixture according to claim 3, wherein the one or more rubber auxiliary substances are a reaction accelerator, aging resistor, heat stabilizer, light stabilizer, anti-ozonant, processing substance, plasticizer, tackifier, expanding agent, dye, pigment, wax, extender, organic acid, retarding agent, metal oxide, or activator.

17. The rubber mixture according to claim 3, wherein the one or more curing agents are a sulphur atom, a sulphur donor or a peroxide.

18. The rubber mixture according to claim 3, wherein the one or more vulcanization accelerators are a mercaptobenzthiazole, sulphenamide, guanidine, thiuram, dithiocarbamate, thiourea or thiocarbonate.

19. A rubber vulcanisate or moulded body prepared from the rubber mixture as claimed in claim 3.

20. A cable sheath, hose, drive belt, conveyor belt, roller coating, tire, shoe sole, sealing ring or damping element prepared from the rubber vulcanisate or moulded body as claimed in claim 19.

* * * * *